(12) United States Patent
Sebastian et al.

(10) Patent No.: US 8,229,170 B2
(45) Date of Patent: Jul. 24, 2012

(54) METHOD AND SYSTEM FOR DETECTING A SIGNAL STRUCTURE FROM A MOVING VIDEO PLATFORM

(75) Inventors: Thomas Baby Sebastian, Clifton Park, NY (US); Peter Henry Tu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 902 days.

(21) Appl. No.: 12/183,326

(22) Filed: Jul. 31, 2008

(65) Prior Publication Data
US 2010/0027841 A1   Feb. 4, 2010

(51) Int. Cl.
*G06K 9/00* (2006.01)
(52) U.S. Cl. .................................................. 382/104
(58) Field of Classification Search ........... 382/100–107; 348/113–120; 356/27–30; 246/473 R–473 A
See application file for complete search history.

(56) References Cited

U.S. PATENT DOCUMENTS

| | | | |
|---|---|---|---|
| 6,937,744 B1 | 8/2005 | Toyama | |
| 7,356,425 B2 | 4/2008 | Krahnstoever et al. | |
| 2002/0054210 A1 | 5/2002 | Glier et al. | |
| 2006/0034484 A1* | 2/2006 | Bahlmann et al. | 382/103 |
| 2007/0217654 A1 | 9/2007 | Rao et al. | |
| 2007/0219681 A1* | 9/2007 | Kumar et al. | 701/19 |
| 2008/0137910 A1* | 6/2008 | Suzuki et al. | 382/104 |
| 2009/0303077 A1* | 12/2009 | Onome et al. | 340/901 |

OTHER PUBLICATIONS

Piva, S. Zara, M. Gera, G. Regazzoni, C.S.; "Color-Based Video Stabilization for Real-Time On-Board Object Detection on High-Speed Trains"; Proceedings of the IEEE Conference on Advanced Video and Signal Based Surveillance 2003; IEEE Computer Society; ISBN: 0-7695-1971-7; (6 Pages).

Yelal, M.R. Sasi, S. Shaffer, G.R. Kumar, A.K.; "Color-Based Signal Light Tracking in Real-Time Video"; Proceedings of the IEEE International Conference on Video and Signal Based Surveillance 2006; IEEE Computer Society; ISBN:0-7695-2688-8; (5 Pages).

* cited by examiner

*Primary Examiner* — Atiba O Fitzpatrick
(74) *Attorney, Agent, or Firm* — Joseph J. Christian

(57) ABSTRACT

The present invention aims at providing a method for detecting a signal structure from a moving vehicle. The method for detecting signal structure includes capturing an image from a camera mounted on the moving vehicle. The method further includes restricting a search space by predefining candidate regions in the image, extracting a set of features of the image within each candidate region and detecting the signal structure accordingly.

23 Claims, 5 Drawing Sheets

METHOD AND SYSTEM FOR DETECTING A SIGNAL STRUCTURE FROM A MOVING VIDEO PLATFORM

CROSS REFERENCE TO RELATED APPLICATIONS

This application is related to the following co-pending U.S. patent application Ser. No. 12/183,334, entitled "Method and system for detecting signal color from a moving video platform" by Rahul Bhotika et al. and filed Jul. 31, 2008, which application is hereby incorporated by reference.

BACKGROUND

The present invention relates generally to detecting a signal structure from a moving video platform, and more specifically to detecting location and state of signal lights from a moving train.

Tracking a location of a signal structure and a color or state of a signal light has an important role in the transportation industry. These capabilities are major considerations when designing an automatic signal detection system. Auto detection of the position of the signal structure and the signal light color using computer vision techniques provides vital evidence in fraudulent accident claims and for improving the overall safety of the rail system. Additionally, these capabilities prevent accidents from occurring when the signal lights are not clearly visible due to weather or climate conditions or changing lighting conditions. Generally, for a locomotive, these kinds of accidents typically occur at railroad crossings. An investigation of an accident completely depends on the unadulterated information gathered at an accident zone. Limited information available from the accident zone causes problems for investigations. These investigations indirectly affect the organizations that are depending on them such as transportation, law enforcement and insurance agencies.

Vehicle mounted recording systems (VMRS) are one type of system that continuously monitors and records such events. In a VMRS system, a camera is mounted on a vehicle to capture events in real time. If an accident occurs, these captured event videos are used as evidence for an investigation. A VMRS, typically continuously records the events occurring on the rail path and area viewable through the camera system and also captures other onboard data such as locomotive speed, time, location, and direction headings. A VMRS does not, however, automatically detect the position of the signal structure or the color associated with the signal light.

Accordingly, it would be desirable to provide a system and a method to supplement a standard VMRS system or the like and that would automatically detect the location of the signal structure and the color of the signal light during daytime as well as during nighttime.

BRIEF DESCRIPTION

In accordance with one exemplary embodiment of the present invention, a method for detecting a signal structure from a moving vehicle is provided. The method includes capturing an image from a camera mounted on the moving vehicle and restricting a search space of the image by predefining candidate regions in the image. The method further includes extracting a set of features of the image within each candidate region and detecting the presence of the signal structure.

In accordance with one embodiment of the present invention a method for detecting a signal structure from a moving vehicle is provided. The method includes capturing a video from a camera and extracting images from the video. The method further includes extracting a set of features of the image within a predefined candidate region. The method also includes tracking the detection of the signal structure to eliminate any false detection.

In accordance with another embodiment of the present invention, a system for detecting the signal structure is provided. The system includes a camera to capture images from a moving vehicle, a descriptor for extracting a set of features from predefined candidate regions in the image. The system further includes a classifier to classify the set of features as a signal structure image or a non-signal structure image.

In accordance with yet another embodiment of the present invention, a computer readable storage medium having a code is provided. The code is written for restricting a search space in an image by predefining candidate regions in the image. The code further provides extracting a set of features of the image within the candidate region and detecting the signal structure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As discussed in detail below, embodiments of the present invention provide a method for detecting a signal structure from a moving video platform. Although the present discussion focuses on rail systems and locomotives, the system is applicable to any moving vehicle, such as a heavy truck, controlled by traffic signals when in operation.

Figure 1:
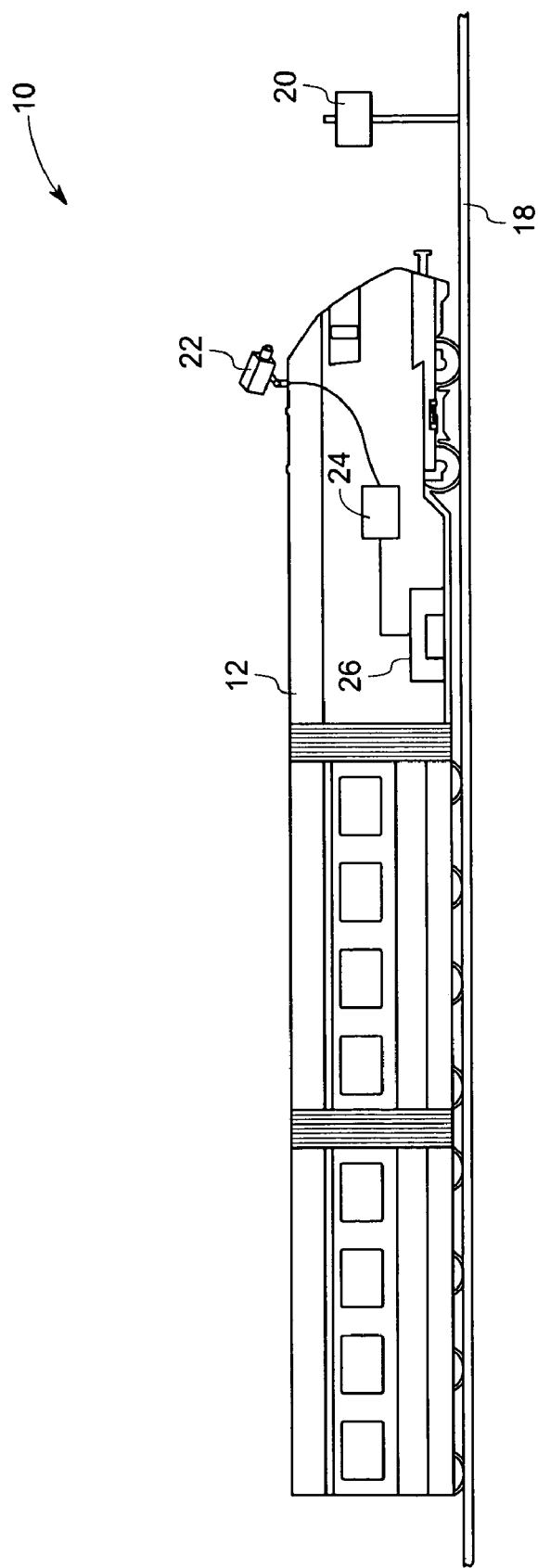
FIG. 1 is a diagrammatical representation of an exemplary system for detecting a signal structure in a railroad train, in accordance with an embodiment of the present invention.

Referring now to the drawings, FIG. 1 illustrates an exemplary system 10 for detecting the presence of a signal structure, which system 10 is mounted inside a locomotive 12 of a railroad train. As discussed above, this invention is broadly applicable and is not limited to any particular type of moving vehicle. While the drawing depicts a steam driven locomotive, this invention can be utilized with all varieties of rail systems including electric and diesel locomotive systems.

As the railroad train travels along the rail track 18 a traffic signal 20 located along the track 18, provides visual cues to a locomotive driver. For example, a yellow traffic signal indicates that the locomotive driver should be prepared to stop the railroad train at the next traffic signal 20. A red traffic signal indicates that the driver should stop the railroad train and a green traffic signal indicates that the next traffic signal 20 will also be a green signal or a yellow signal. It should be noted that, in another railway signaling system, the colors of the traffic signals might provide various different visual cues.

In accordance with one embodiment of the instant invention, a video camera 22 is mounted on the locomotive to acquire video or still images of the surroundings of the locomotive. In one embodiment, the camera 22 is a pan-tilt-zoom (PTZ) camera that is configured to pan about a vertical axis, tilt about a horizontal axis, and control a lens assembly to enable the camera 22 to zoom. In one embodiment, a high-speed camera may be used instead of a video camera. In another embodiment, the camera 22 is housed in an enclosure for protection from the surrounding environment. In yet another embodiment, more than one camera may be mounted on the locomotive to acquire video or still images of the surroundings.

A video signal (not shown) is generated by the camera 22 in correspondence to the still images or videos collected, and the video signal is transmitted to a processor 24. The processor 24 processes and analyzes the video signal and detects the presence of the signal structure. The processor 24 receives programmed instructions, from software, firmware and data from a memory and performs various operations using the data and instructions.

Processor may include an arithmetic logic unit (ALU) that performs arithmetic and logical operation and a control unit that extracts instructions from memory and decodes and executes the instructions, calling on the ALU when necessary. For example, the memory used may be random-access memory (RAM) and read-only memory (ROM). In addition, the memory may include an operating system, which operating system executes on the processor. The operating system performs basic tasks that include recognizing input, sending output to output devices, keeping track of files and directories and controlling various peripheral devices. In one embodiment, the results of the signal structure detection are sent to a control room (not shown) via a remote monitoring system (26).

As used herein, references to "processor" are to be understood to refer to central processing units, microprocessors, microcontrollers and any other circuit or processor capable of executing the functions described herein. Similarly, references to "software" and "firmware" are interchangeable, and are to be understood to refer to and include any computer program stored in memory for execution by the processor 24.

The memory may also store a database composed of a variety of information that may be used in conjunction with the video signals acquired. The database may include data including, but not limited to: (i) the locations of railway track routes, and track mapping, (ii) the locations of signal structures in those railway track routes, and (iii) the locations of railroad crossings. The database can also assist to improve the accuracy of the signal structure detection and, as discussed in more detail below.

Figure 2:
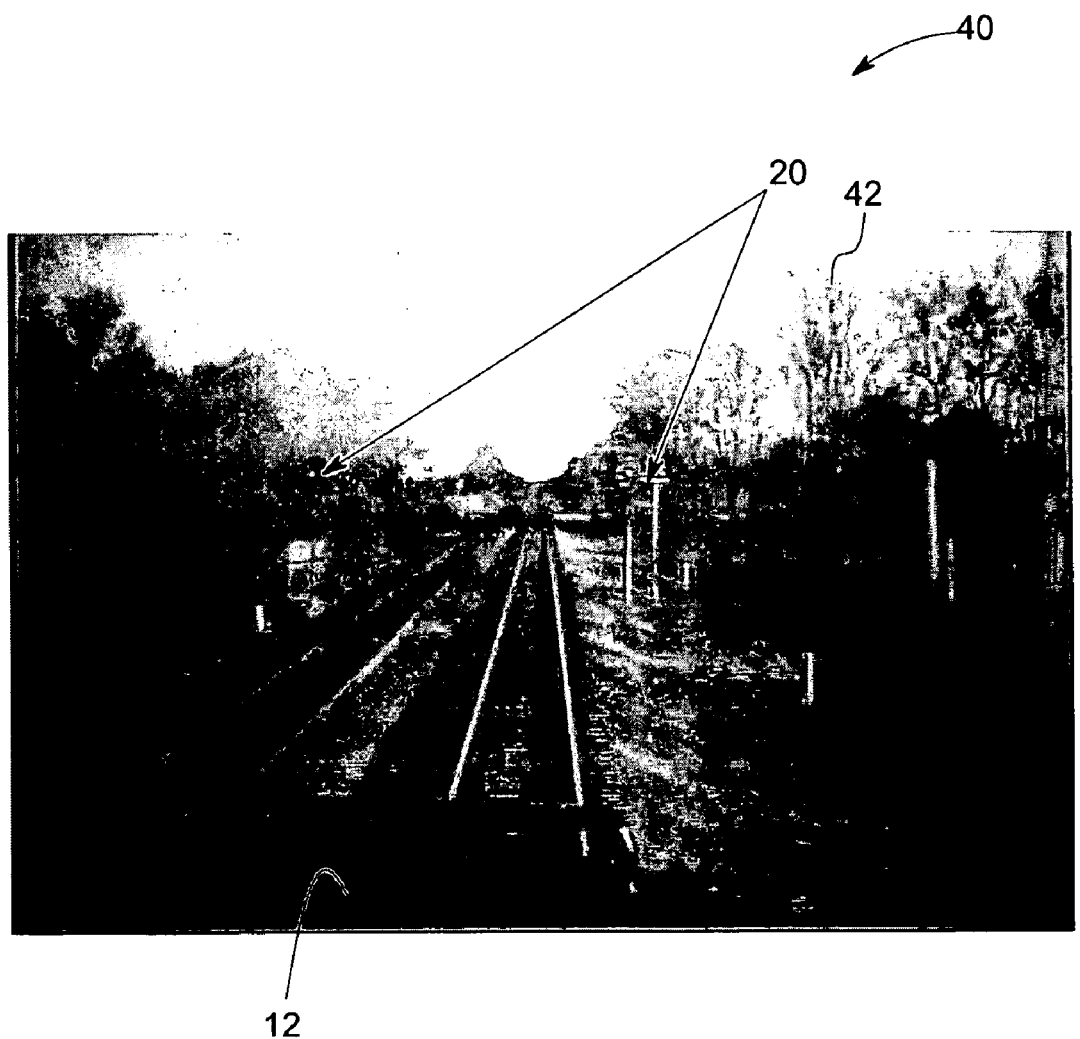
FIG. 2 is a pictorial view of an image taken from a camera mounted on a railroad train during daytime representing various vertical structures.

FIG. 2 is pictorial view 40 of an image taken from the video camera 22 (FIG. 1) mounted on the locomotive 12 during the daytime. The image shows signal structures 20 located along the track along with various other vertical structures like trees 42. One challenge with automatic signal detection systems is to reliably detect or identify signal structures 20 amongst all of the trees, physical structures, and other objects surrounding the track. Variations in the signal structure locations and looming effects from the camera motion also make it difficult to detect the signal structure. As will be appreciated by those skilled in the art, looming refers to the rapid expansion http://en.wikipedia.org/wiki/Expansion in the size of an object or the signal structure, so that its image becomes increasingly large.

The detection of signal structures in the complete image taken by the camera is not typically necessary. A search space in the image (i.e., the space where the signal structures are detected) is typically restricted by predefining a candidate region. The candidate region is the region where the signal structures are likely to be in the image. The search space is further restricted by placing candidate boxes in the candidate region. The candidate boxes are determined by camera calibration. The size of the candidate box is approximately equal to the signal structure size. In one embodiment, an exemplary camera calibration technique is used to establish connection between the signal structure measurement and the measurement of the image acquired by the camera. For example, the camera calibration technique is used to map measurements in world coordinates to image coordinates. The measurements may include for example, the height of the signal structure, the width of the track, and an estimate of the ground plane. The camera calibration involves determining various projection matrices. The projection matrix provides the relation between actual structure and its image. For example, if the signal structure is located at 100m from the locomotive, then the projection matrix determines its size in the image for that distance and provides the candidate box of that size. Similarly, various other candidate boxes are determined for the signal structures located at various distance points from the locomotive.

Figure 3:
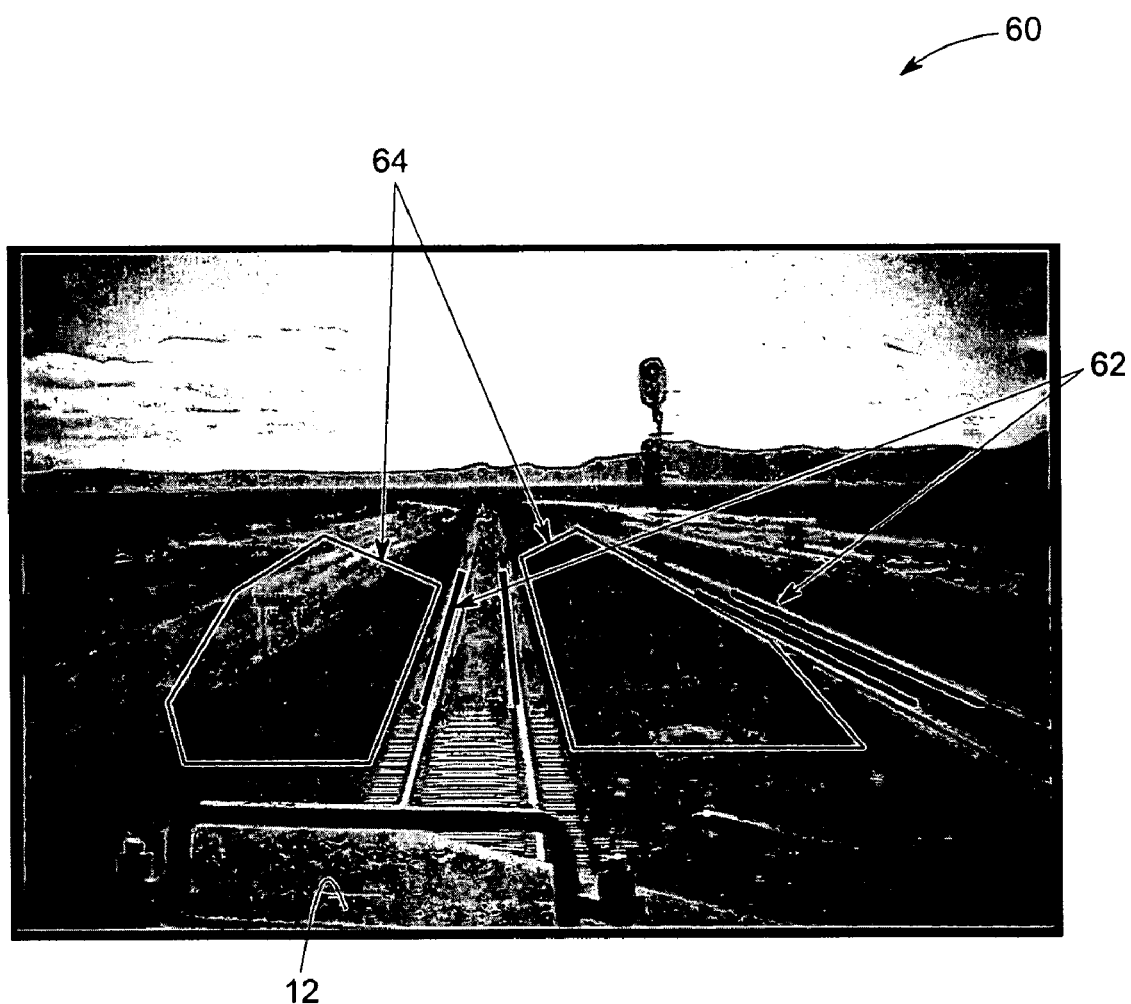
FIG. 3 is a pictorial view of an image taken from the camera mounted on the railroad train during daytime and a search space for a signal structure detection algorithm, in accordance with an embodiment of the present invention.
Figure 4:
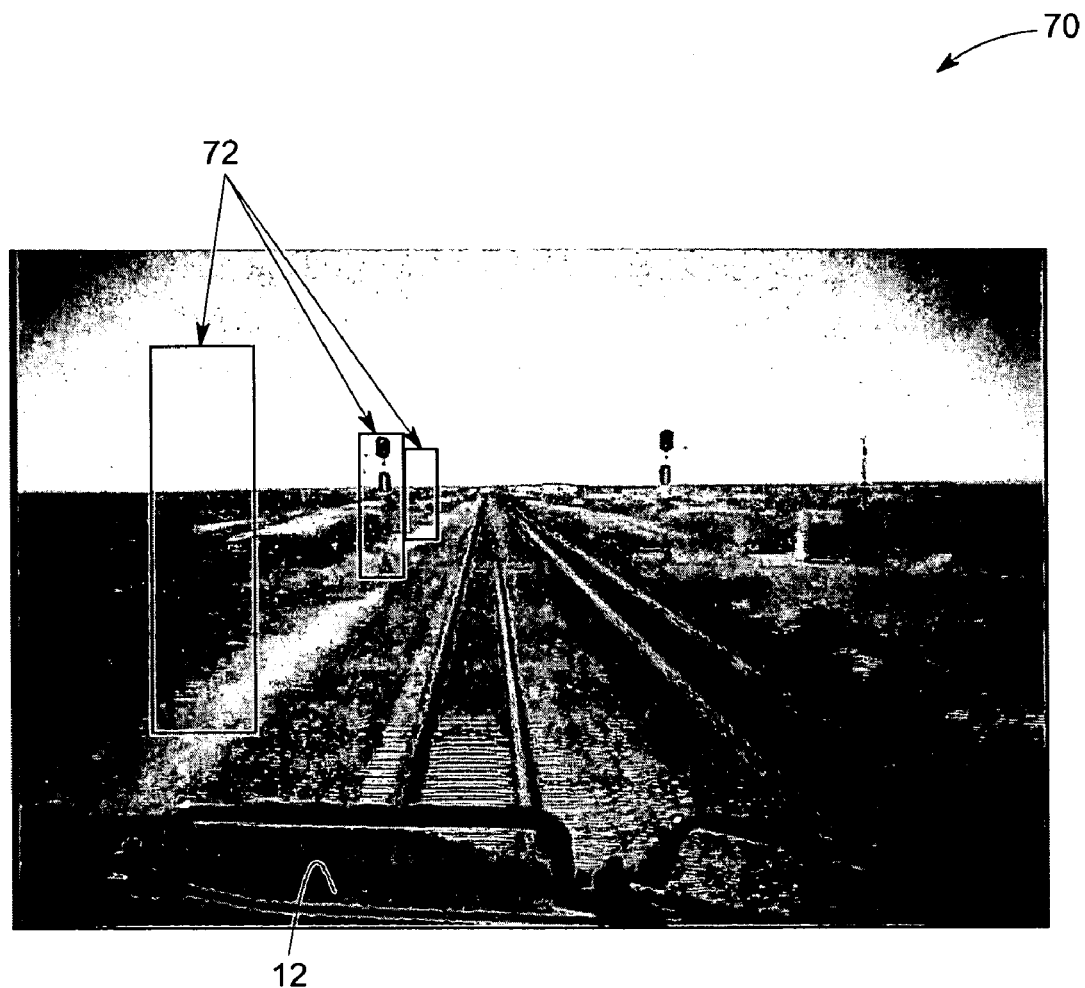
FIG. 4 is pictorial view of an image taken from the camera mounted on the railroad train during daytime and candidate boxes of the signal structures, in accordance with an embodiment of the present invention.

FIG. 3 shows an image 60 taken from the camera mounted on the locomotive 12 during daytime. The track position 62 and the area 64 surrounding the track are also shown in FIG. 3. A signal structure detection algorithm searches for signal structures only in that area 64. The signal structure detection algorithm is explained below. Similarly, FIG. 4 is another image 70 taken from the camera mounted on the locomotive 12 during daytime. The image 70 further shows candidate boxes 72, where signal structures may be found in the image. The candidate box size is approximately equivalent to the expected signal structure size. This further restricts the area where signal structures are detected by the signal structure detection algorithm. The candidate boxes are determined by camera calibration. It should be noted that, various other methods of camera calibration can also be used in one embodiment of the present invention.

In one embodiment a classifier is trained to classify between a positive (a signal structure image) and a negative (a non-signal structure image). The classifier is trained using descriptors of positive and negative training samples, representing signal structure images and non-signal structure images, respectively. The descriptor translates regions of real world images into numerical representations of the features of such images. The classifier is used in the signal structure detection algorithm for each candidate image window to determine whether a respective signal structure is present or not.

Figure 5:
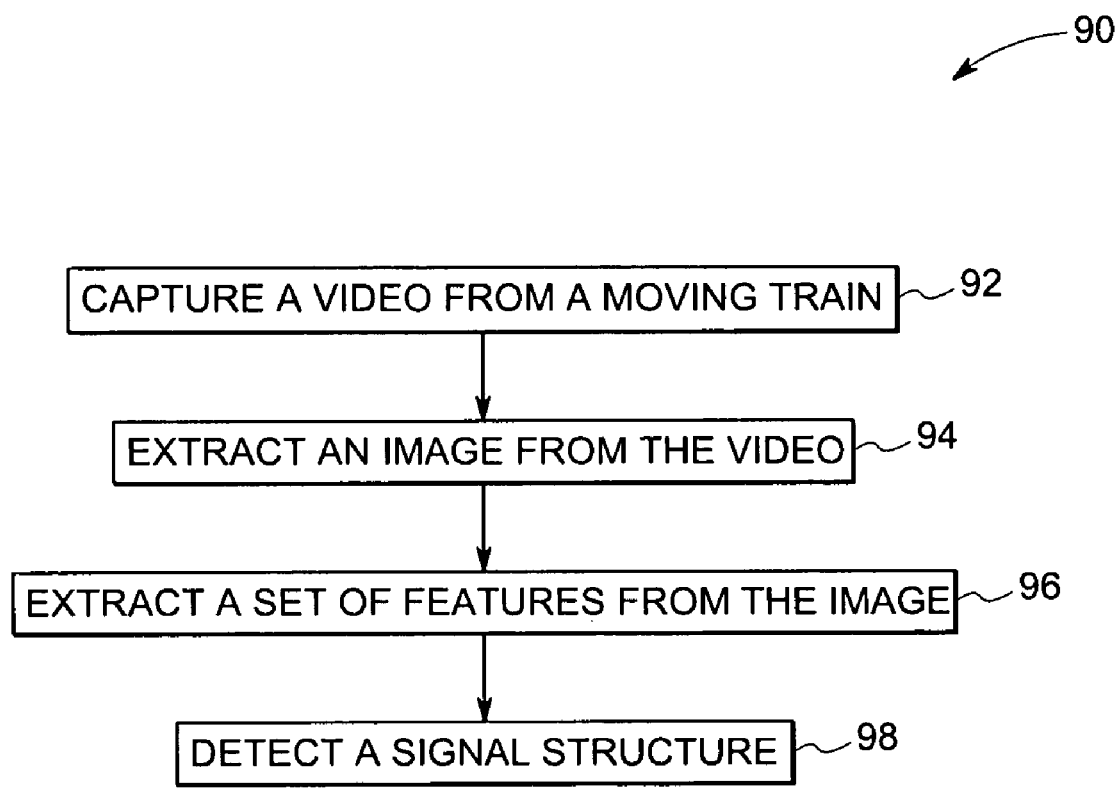
FIG. 5 is a flow chart representing steps in an exemplary method of detecting the signal structure, in accordance with an embodiment of the present invention.

FIG. 5 is a flow chart representing steps in an exemplary method or algorithm 90 for detection of the signal structure. The method includes acquiring a video or still images from a moving train in step 92. As explained earlier, the video is acquired from a video camera or a high-speed digital camera mounted on the locomotive. The video may be in the form such as but not limited to, a MPEG file or an AVI file and the still image may be in the form of a JPEG file or a TIFF file. In step 94, an image is extracted from the video. In step 96 the features vector is extracted from the extracted image. The features vector is also known as a set of features. As explained earlier, the camera calibration identifies candidate boxes where signal structures are likely to be in the image. The features of the objects within the candidate boxes are extracted in step 96. This ensures an efficient signal structure detection algorithm. The extracted set of features contains various objects apart from the signal structure. A machine learning technique such as adaptive boosting (Adaboost) or support vector machine (SVM) then classifies the set of features. In step 98, the signal structure is detected by classifying the set of features as the set of features for the signal-structure or the set of features for the non-signal structure. As explained earlier, a classifier is trained in advance to classify the set of features for each representative signal structure. In one embodiment, a color detection technique may be used to detect the signal color. During daytime, the camera may not capture all color pixels due to sunlight. Thus, in one embodiment, a high-resolution camera is used to detect the signal color during daytime.

In one embodiment, a tracking algorithm is used for tracking the signal structure in the image to eliminate a false detection or to eliminate a detection of the signal structure that is not correct. This enhances robustness of the signal structure detection algorithm. The tracking algorithm properly weighs the confidence in detection of the signal structure in each single-frame of a video sequence. The signal structure location database stored in the memory may also be used in this algorithm. The detected signal structures are then cross-checked against the images in the database. It should be noted that other tracking algorithms can also be used in one embodiment of the present invention.

As will be appreciated by those of ordinary skill in the art and as described earlier, the foregoing algorithms and algorithm steps may be implemented by a suitable computer program code on a processor-based system, such as a general-purpose computer or a special-purpose computer.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for detecting a signal structure from a moving vehicle comprising:
   capturing an image from a camera mounted on the moving vehicle;
   restricting a search space by predefining candidate regions in the image based on locations of signal structures along railway tracks stored in a memory;
   extracting a set of features of the image within each candidate region; and
   detecting the signal structure;
   wherein restricting the search space by predefining candidate regions in the image comprises mapping a set of measurement in world coordinates to a set of measurement in image coordinates based on a projection matrix.

2. The method of claim 1, wherein the moving vehicle comprises a railroad train.

3. The method of claim 1, wherein restricting the search space comprises detecting a path of the vehicle.

4. The method of claim 1, wherein the candidate region is provided by calibrating the camera.

5. The method of claim 1, wherein the set of measurement comprises the height of the signal structure with respect to the ground plane.

6. The method of claim 4, wherein the candidate region comprises a candidate box.

7. The method of claim 6, wherein the candidate box size is approximately equivalent to the signal structure size.

8. The method of claim 1, wherein detecting the signal structure comprises classifying the set of features as a signal structure image region or a non-signal structure image region.

9. The method of claim 8, comprising classifying extracted features using a machine learning technique.

10. The method of claim 9, wherein the machine learning technique comprises support vector machine learning technique or boosting technique.

11. The method of claim 1, further comprising tracking the signal structure in the image to eliminate false detections.

12. A method for detecting a signal structure from a moving vehicle comprising:
    capturing a video from a camera mounted on the moving vehicle;
    extracting an image from the video;
    restricting a search space by predefining candidate regions in the image based on locations of signal structures along railway tracks stored in a memory;
    extracting a set of features of the image within each candidate region;
    detecting the signal structure; and
    tracking the detection of the signal structure to eliminate a false detection;
    wherein restricting the search space by predefining candidate regions in the image comprises mapping a set of measurement in world coordinates to a set of measurement in image coordinates based on a projection matrix.

13. A system for signal structure detection comprising:
    a camera configured to capture video or images from a moving vehicle;
    a descriptor configured to extract a set of features from at least one predefined candidate region in the image; and
    a classifier configured to classify the set of features as a signal structure image or a non-signal structure image;
    wherein the descriptor is further configured to map a set of measurement in world coordinates to a set of measurement in image coordinates based on a projection matrix.

14. The system of claim 13, wherein the camera comprises a video camera or a high-speed digital camera.

15. The system of claim 13, wherein the camera comprises a pan-tilt-zoom camera.

16. The system of claim 13, wherein the moving vehicle comprises a railroad train.

17. The system of claim 13, wherein the candidate region is provided by camera calibration.

18. The system of claim 13, wherein the descriptor and the classifier are implemented by appropriate programming of a digital processor.

19. The system of claim 13, wherein the classifier comprises a machine learning technique algorithm.

20. The system of claim 19, wherein the machine learning technique algorithm comprises adaptive boosting algorithm.

21. The system of claim 19, wherein the machine learning technique algorithm comprises support vector machine algorithm.

22. A non-transitory computer-readable storage medium comprising computer-readable instructions of a computer program that, when executed by a processor, cause the processor to perform a method for detecting a signal structure in an image comprising:
    restricting a search space in the image by predefining candidate regions in the image based on locations of signal structures along railway tracks stored in a memory;

extracting a set of features of the image within the candidate region; and
detecting a signal structure;
wherein restricting the search space by predefining candidate regions in the image comprises mapping a set of measurement in world coordinates to a set of measurement in image coordinates based on a projection matrix.

23. The non-transitory computer-readable storage medium of claim 22, further comprising a code for classifying the set of features as a signal structure image or a non-signal structure image.

* * * * *